July 31, 1945.  W. R. McKAY  2,380,660
FLUID CLUTCH
Original Filed July 19, 1941

WILLIAM R. McKAY,
INVENTOR.

BY Edwin D. Jones
ATTORNEY.

Patented July 31, 1945

2,380,660

UNITED STATES PATENT OFFICE 2,380,660

FLUID CLUTCH

William R. McKay, Compton, Calif., assignor of one-half to Harry F. Langlois and Herbert N. Langlois, both of Los Angeles, Calif.

Original application July 19, 1941, Serial No. 403,167. Divided and this application February 10, 1943, Serial No. 475,383

9 Claims. (Cl. 192—58)

My invention relates to fluid clutches and is a division of my application for variable speed transmission mechanism, Serial Number 403,167, filed July 19, 1941, now Patent No. 2,321,226.

A purpose of my invention is the provision of a fluid clutch characterized by its ability to increase the power transmission or torque from driving rotor to driven rotor, over previously designed clutches; to simplify the construction of fluid clutches; and to provide a concentric arrangement of driving and driven rotors to reduce the overall width of the clutch so that a plurality of such clutches may be arranged within a relatively small compass and thus successfully incorporated in a transmission mechanism of the character embodied in my parent application above recited.

I will describe only one form of fluid clutch embodying my invention, and will then point out the novel features thereof in the claims.

Figure 1:
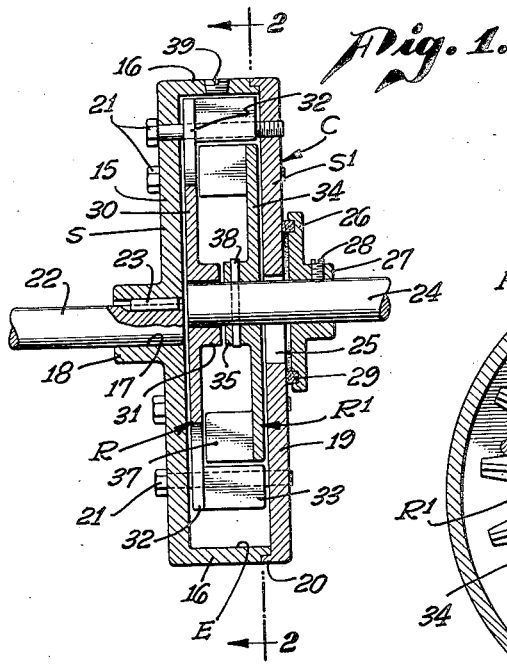
Fig. 1 is a central vertical sectional view showing one form of fluid clutch embodying my invention.

Referring specifically to the drawing in which similar reference characters refer to similar parts in each of the several views, my invention in its present embodiment comprises a casing C made up of a front section S and a rear section $S^1$, and within which is contained the driving rotor R and the driven rotor $R^1$ of my clutch.

The section S comprises a disk 15 having a peripheral annulus 16 and an axial opening 17 surrounded by a collar 18. The section $S^1$ comprises a disk 19 having a peripherial and annular flange 20 which has a rabbeted connection with the confronting edge of the annulus 16 to provide a fluid tight chamber in which the rotors R and $R^1$ operate.

The two sections S and $S^1$ are secured to each other by an annular series of bolts 21 which extend through the disk 15 and are threaded in the disk 19, and these bolts are spaced apart equi-distantly for a purpose which will become clear as the description proceeds.

One end of a driving shaft 22 extends into the collar 18 and is secured therein by a key 23 to rotate the casing C when the shaft is driven by any suitable means. One end of a driven shaft 24 extends through the disk 19 by the provision therein of an opening 25 which is relatively large and eccentric to both disks 15 and 19 in order to compensate for the motion of the shaft 24 which is eccentric to the casing C and to the driving shaft 22.

To maintain the casing C fluid tight about the driven shaft 24 the opening is closed by a plate 26 provided with a collar 27 secured to the shaft by a screw 28. The joint between the plate and the disk is closed by a gasket 29 secured in the plate.

Figure 3:
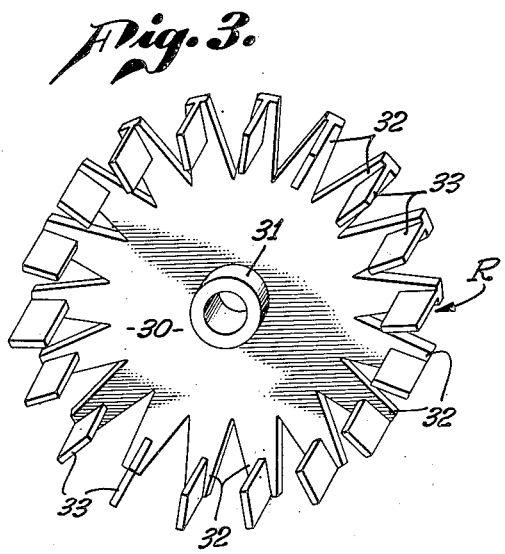
Fig. 3 is a detail perspective view of the driving rotor of the fluid clutch shown in the preceding views.

As best shown in Fig. 3, the driving rotor R comprises a disk 30 having an axial hub 31 and an annular series of equi-distantly spaced radial fingers 32 on its periphery. Each finger has formed thereon a vane 33 disposed at right angles thereto and of less length than the finger. These vanes provide an annular series all of which are disposed to one side of the disk 30.

Figure 4:
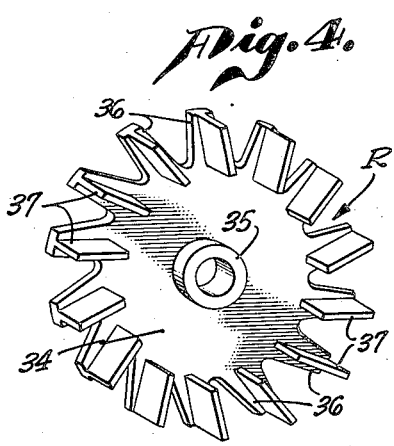
Fig. 4 is a detail perspective view of the driven rotor of the fluid clutch shown in Figs. 1 and 2.

As shown to advantage in Fig. 4, the driven rotor $R^1$ is made up of a disk 34 smaller than the rotor disk 30 but having an axial hub 35 and peripherial recesses providing an annular series of equi-distantly spaced and tapered fingers 36. On one side of each finger is fixed a vane 37, and thus an annular series of vanes are provided on the confronting side of the driving rotor R when the two rotors are assembled. It is important to note that the fingers 36 are disposed at an angle to a line radially of the rotor, and the vanes 37 being along the major axis of the fingers are disposed similarly to the fingers.

As the rotors R and $R^1$ are assembled in the casing C, the hub 31 of the rotor R is not fixed to the inner end of the shaft 24 so that the rotor is free to rotate on the shaft. However, the driving rotor R is caused to rotate with the casing when the latter is driven by the shaft 22, because the bolts are in engagement with one edge of the fingers 32. The rotor $R^1$ has its hub 35 receiving the shaft 24, and transmits its rotary motion to the shaft by having its hub fixed to the shaft by a pin 38.

With the rotors R and $R^1$ mounted on the shaft 24 as described, and the shaft 24 eccentric to the casing C as well as to the shaft 22, it becomes apparent that when the clutch is in operation the two rotors move eccentrically of the casing and the shaft 22, and at all times provide a chamber E of substantially crescent form between the circle defined by the fingers 32 and the inner periphery of the casing. It also becomes apparent that the series of vanes 37 are within the circle defined by the inner ends of the series of vanes 33, and that the overall width of the two rotors is equal only to the width of the driving rotor.

Figure 2:
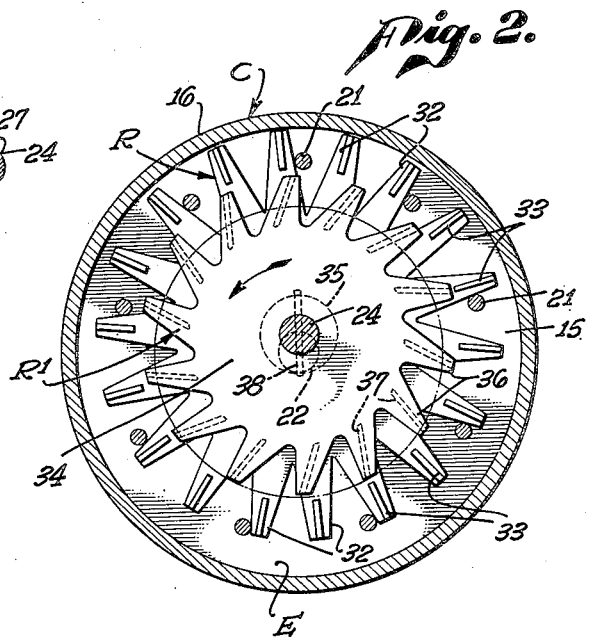
Fig. 2 is vertical sectional view taken on the line 2—2 of Fig. 1.

In practice, the casing is adapted to be partially filled with any suitable fluid through the filling plug 30, so that the clutch when actuated, operates as follows:

With rotation of shaft 22, casing C is driven in a counterclockwise direction as when viewed in Fig. 2, to, in turn, drive the rotor R through the bolts 21. Under such rotation of the casing centrifugal force moves the fluid in the casing outwardly against the inner wall thereof to assume a circular form the inner boundary of which is defined by the broken line in Fig. 2. Here the fluid is rotated by the vanes 33 of the driving rotor as well as the casing, to generate kinetic energy in the fluid. Inasmuch as the driven rotor vanes 37 project into the now rotating body of fluid, the kinetic energy possessed by the fluid is expended against the vanes 37, thereby transferring the torque of the driving rotor to the driven rotor.

By reason of the eccentric mounting of the rotors R and R¹ in the casing C, the fluid is permitted to run free with the housing through the wide portion of the chamber E. But through the narrow portion of the chamber the fluid is forced into contact with the vanes 37. During the free running period of the fluid, kinetic energy is accumulated therein to a maximum, because its motion is unimpeded by the vanes 37. However, during the major and remaining period of the cycle of fluid circulation, that energy thus accumulated is expended fully against the vanes 37.

In this manner is effected the hydraulic transfer of torque from the driving rotor to the driven rotor, with only a minimum of power loss. This power loss is further reduced by virtue of the angular arrangement of vanes 37, for it will be clear that as the fluid is impelled against the vanes 37 by the vanes 33, such angular positioning of the vanes 37 causes a maximum expansion thereagainst of the energy accumulated in the fluid.

Another factor which contributes to high efficiency in power transfer from the driving rotor to the driven rotor, is the fact that because of the concentric arrangement of the two circular series of rotor vanes, there is practically no leakage of fluid between the two series of vanes.

In the operation of the fluid clutch, the rotors R and R¹ having a center of rotation offset in respect to the center of rotation of the casing C, there is of necessity relative movement radially between the rotors and the casing, which is permitted by the eccentric opening 25, and the spacing of the fingers 32 which allows the bolts 21 to move inwardly and outwardly.

Although I have herein shown and described only one form of fluid clutch, embodying my invention, it is to be understood that various changes and modifications may be made herein without departing from the spirit of my invention and the spirit and scope of the appended claims.

I claim:

1. A fluid clutch, comprising: an axially rotatable casing; a driving rotor mounted for rotation within and with said casing but about an axis disalined to the rotational axis of said casing; and a driven rotor concentrically within said driving rotor and rotatable about the same axis as the latter.

2. In a fluid clutch, driving and driven members, said members having vanes in circular series to provide fluid circulating passages cooperating with each other, the series of vanes of the driven member being concentrically within the series of vanes of the driving member, a rotatable casing housing said members, and means for mounting said casing and said members for rotation about different axes.

3. In a fluid clutch, a driving member having a circular series of radially disposed vanes, and a driven member having a circular series of vanes concentrically within the series of vanes of the driving member and with each vane disposed at an angle to the vanes of the driving member, a casing housing said members, and means for mounting said casing and said members for rotation about different axes.

4. In a fluid clutch: a rotatable casing; a driving rotor mounted eccentrically within said casing; a driving connection between said casing and said rotor; and a driven rotor mounted concentrically within said driving rotor.

5. In a fluid clutch: a rotatable casing; a driving rotor mounted eccentrically within said casing; a driving connection between said casing and said rotor; and a driven rotor mounted concentrically within said driving rotor, and having vanes extending spirally in the direction of rotation thereof.

6. In a fluid clutch; an axially rotatable casing having a circular chamber therein; a driving rotor, operatively connected to said casing and disposed within said chamber; a driven rotor within said driving rotor; and means for mounting said rotors eccentrically within said chamber.

7. As an article of manufacture, a driven rotor for fluid clutches, comprising a disk having an annular series of fingers on the periphery thereof and said fingers disposed at an angle to lines radially of said disk; and vanes fixed to one side of said fingers along the major axes thereof.

8. A fluid clutch comprising: an axially rotatable casing having a circular chamber therein; an annular series of members secured to and extending inwardly from one side of said casing; a driving rotor having peripherial fingers engageable by said members to form a driving connection between said casing and said rotor; vanes fixed to and extending laterally from one side of said rotor; a driven rotor in said casing and disposed within the area defined by said vanes, and having peripherial fingers, and vanes fixed to and extending laterally from that side of said fingers confronting the fingers of said driving rotor, and means for mounting said rotors and said casing for rotation about different axes.

9. A fluid clutch as embodied in claim 8, wherein the vanes of said driven rotor are disposed at a fixed angle to the vanes of the driving rotor.

WILLIAM R. McKAY.